United States Patent
Poscher et al.

(10) Patent No.: US 12,538,363 B2
(45) Date of Patent: Jan. 27, 2026

(54) DEVICE AND METHOD FOR VIRTUAL DATA SESSION ESTABLISHMENT TO CONTROL LOAD SHARING WITHIN A FIXED WIRELESS ACCESS DOMAIN ACCORDING TO A PREDETERMINED CRITERIA

(71) Applicant: Telefonaktiebolaget LM Ericsson (publ), Stockholm (SE)

(72) Inventors: Jens Poscher, Aachen (DE); Stefan Eichinger, Pulheim (DE); Ralph Detke, Herzogenrath (DE); Pedro Tercero, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 721 days.

(21) Appl. No.: 17/760,593

(22) PCT Filed: Sep. 19, 2019

(86) PCT No.: PCT/EP2019/075156
§ 371 (c)(1),
(2) Date: Mar. 15, 2022

(87) PCT Pub. No.: WO2021/052587
PCT Pub. Date: Mar. 25, 2021

(65) Prior Publication Data
US 2022/0346161 A1    Oct. 27, 2022

(51) Int. Cl.
*H04W 76/10*    (2018.01)
*H04L 5/00*    (2006.01)
(Continued)

(52) U.S. Cl.
CPC ........... *H04W 76/10* (2018.02); *H04L 5/0044* (2013.01); *H04L 12/4641* (2013.01);
(Continued)

(58) Field of Classification Search
CPC . H04L 12/4641; H04L 45/586; H04L 41/342; H04L 49/70; H04L 1/0089;
(Continued)

(56) References Cited

U.S. PATENT DOCUMENTS

| 10,965,523 B1* | 3/2021 | Johnson .............. H04L 41/0803 |
| 2005/0163115 A1* | 7/2005 | Dontu .................... H04L 45/18 |
| | | 370/389 |

(Continued)

FOREIGN PATENT DOCUMENTS

| WO | 2018067956 A1 | 4/2018 |
| WO | 2019007226 A1 | 1/2019 |

OTHER PUBLICATIONS

"3rd Generation Partnership Project; Technical Specification Group Services and System Aspects; System Architecture for the 5G System; Stage 2 (Release 15)", 3GPP TS 23.501 V15.2.0, Jun. 2018, 217 pages.

*Primary Examiner* — Salvador E Rivas
(74) *Attorney, Agent, or Firm* — Sage Patent Group

(57) ABSTRACT

The present invention relates to concepts underlying the realization of a virtual data session, and in more detail to a virtual data session control device, to a fixed wireless access device supporting a virtual data session, to a user data plane device supporting a virtual data session, to an access and mobility management device supporting a virtual data session, and to related control methods. Here, a virtual data session is an aggregation of at least two data sessions (22, 24) set up between at least two fixed wireless access devices (26, 28) forming a fixed wireless access domain in a cellular infrastructure and a data plane device (20) providing interconnection functionality between the cellular infrastructure and an external data network (18).

8 Claims, 13 Drawing Sheets

(51) Int. Cl.
*H04L 12/46* (2006.01)
*H04L 45/58* (2022.01)
*H04L 49/354* (2022.01)
*H04W 24/08* (2009.01)
*H04W 28/088* (2023.01)
*H04W 48/16* (2009.01)
*H04W 12/42* (2021.01)
*H04W 80/10* (2009.01)

(52) U.S. Cl.
CPC ............ *H04L 45/58* (2013.01); *H04L 49/354* (2013.01); *H04W 24/08* (2013.01); *H04W 28/088* (2023.05); *H04W 48/16* (2013.01); *H04W 12/42* (2021.01); *H04W 80/10* (2013.01)

(58) Field of Classification Search
CPC . H04L 5/0044; H04L 27/2608; H04L 49/354; H04L 63/0272; H04W 12/42
See application file for complete search history.

(56) References Cited

U.S. PATENT DOCUMENTS

| | | | |
|---|---|---|---|
| 2014/0169168 A1* | 6/2014 | Jalan | H04L 41/0894 370/235 |
| 2014/0230044 A1* | 8/2014 | Liu | H04L 41/28 726/15 |
| 2014/0244851 A1* | 8/2014 | Lee | H04L 45/54 709/228 |
| 2015/0067536 A1* | 3/2015 | Leorin | H04W 12/06 715/753 |
| 2018/0039511 A1* | 2/2018 | Nakano | H04L 12/4641 |
| 2018/0041994 A1* | 2/2018 | Zhang | H04W 40/20 |
| 2018/0199240 A1 | 7/2018 | Dao et al. | |
| 2019/0007322 A1* | 1/2019 | Guo | H04L 45/586 |
| 2019/0150210 A1* | 5/2019 | Nakano | H04W 92/14 455/418 |
| 2019/0191330 A1 | 6/2019 | Dao et al. | |
| 2020/0389526 A1* | 12/2020 | Singleton, IV | H04L 67/141 |

* cited by examiner

DEVICE AND METHOD FOR VIRTUAL DATA SESSION ESTABLISHMENT TO CONTROL LOAD SHARING WITHIN A FIXED WIRELESS ACCESS DOMAIN ACCORDING TO A PREDETERMINED CRITERIA

FIELD OF INVENTION

The present invention relates to concepts underlying the realization of a virtual data session, and in more detail to a virtual data session control device, to a fixed wireless access device supporting a virtual data session, to a user data plane supporting a virtual data session, to an access and mobility management device supporting a virtual data session, and to related control methods.

BACKGROUND ART

Generally, fixed wireless access devices are known as components of cellular infrastructures providing functionality to establish data sessions to an external network which is interoperating with the cellular infrastructure.

Further, fixed wireless access devices are often placed by customers inside the household without optimizing the position for best connectivity, radio conditions, and performance. Thus, obstacles can negatively impact the radio channel quality, e.g., due to shielding and reflections by buildings, trees etc.

Further, the throughput of data sessions depends on individual radio link characteristics. These individual radio link characteristics can differ significantly between neighbouring fixed wireless access devices even when they are positioned close to each other.

A problem with existing fixed wireless access solutions is a limitation of end user throughput and reachability due to the problems indicated above.

SUMMARY OF INVENTION

In view of the above, the object of the present invention is to provide fixed wireless access solutions for a cellular infrastructure with improved operative characteristics.

A first aspect of the present invention relates to a virtual data session control device for control of a virtual data session. According to the present invention the virtual data session is an aggregation of at least two data sessions set up between at least two fixed wireless access devices of a cellular infrastructure and at least one data plane device providing interconnection functionality between the cellular infrastructure and an external data network. The virtual data session control device comprises a virtual data session supervision unit adapted to supervise virtual data session characteristics through measurement of at least one operative characteristic of at least one data session, at least one fixed wireless access device, at least one link between the least two fixed wireless access devices, and/or at least one data plane device being involved in the virtual data session. The virtual data session control device further comprises a virtual data session control unit adapted to adjust the setup of the virtual data session based on the result of measurement for the at least one operative characteristic.

A second aspect of the present invention relates to a virtual data session control method for control of a virtual data session as outlined above. The virtual data session control method comprises a virtual data session supervision operation for supervising virtual data session characteristics through measurement of at least one operative characteristic of at least one data session, at least one fixed wireless access device, at least one link between the least two fixed wireless access devices, and/or at least one data plane device being involved in the virtual data session. The virtual data session control method further comprises a virtual data session control operation for adjusting the setup of the virtual data session based on the result of measurement for the at least one operative characteristic.

A third aspect of the present invention relates to a fixed wireless access device operated in a cellular infrastructure and supporting virtual data session functionality for a virtual data session as outlined above. The fixed wireless access device comprises a virtual data session setup unit adapted to receive a virtual session command to join a virtual data session. The fixed wireless access device comprises a data session initiation unit adapted to initiate at least one data session for exchange of payload data of the virtual data session to/from the fixed wireless access device and a relay unit adapted to relay payload data of the virtual data session to/from at least one neighbouring fixed wireless access device in the fixed wireless access domain for load sharing within the fixed wireless access domain. Still further, the fixed wireless access device comprises a virtual data session control unit adapted to control the load sharing between at least one data session of the virtual data session and the relay unit according to predetermined criteria.

A fourth aspect of the present invention relates to a method of fixed wireless access to a cellular infrastructure supporting virtual data session functionality for a virtual data session as outlined above. The method for fixed wireless access comprises a command receiving operation for receiving a virtual session command to join a virtual data session. Then, a data session initiation operation is executed for initiating at least one data session for exchange of payload data of the virtual data session to/from the fixed wireless access device. Further, a relay operation is for relaying payload data of the virtual data session to/from at least one neighbouring fixed wireless access device in the fixed wireless access domain and for load sharing within the fixed wireless access domain. Still further, a virtual data session control operation is for controlling the load sharing between at least one data session of the virtual data session and the relay unit according to predetermined criteria.

A fifth aspect of the present invention relates to a data plane device providing interconnection functionality between a cellular infrastructure and an external data network and supporting virtual data session functionality for a virtual data session as outlined above. The data plane device comprises at least one virtual data session termination unit adapted to terminate the at least two data sessions set up for exchange of payload data with the data plane device and further a data plane control unit adapted to control a virtual data session established through aggregation of the at least two data sessions terminated by the at least one data session termination unit.

A sixth aspect of the present invention relates to a method of providing interconnection functionality between a cellular infrastructure and an external data network at a data plane device supporting virtual data session functionality for a virtual data session as outlined above. The method comprises at least one virtual data session termination operation for terminating the at least two data sessions set up for exchange of payload data with the data plane device and a data plane control operation for controlling a virtual data session established through aggregation of the at least two data sessions terminated by the at least one data session termination unit.

A seventh aspect of the present invention relates to an access and mobility management device supporting a virtual data session as outlined above. The access and mobility management device comprises a virtual data session registration unit adapted to receive a request for registration from a virtual data session control device controlling a virtual data session, to receive a request for registration from fixed wireless access devices being involved in the virtual data session, and to register the fixed wireless access devices at the virtual data session control device. The access and mobility management device further comprises a relay unit adapted to relay virtual data session related control information between a virtual data session control device controlling the virtual data session and the registered fixed wireless access devices.

An eighth aspect of the present invention relates to a method of access and mobility management with virtual data session support for a virtual data session as outlined above. The method comprises a virtual data session registration operation for receiving a request for registration from a virtual data session control device controlling a virtual data session, for receiving a request for registration from fixed wireless access devices ( ) being involved in the virtual data session, and for registering the fixed wireless access devices at the virtual data session control device. The method further comprises a relay operation for relaying virtual data session related control information between a virtual data session control device controlling the virtual data session and the registered fixed wireless access devices.

BRIEF DESCRIPTION OF DRAWING

In the following the present invention will be explained in a non-binding manner through reference to the drawing in which.

DETAILED DESCRIPTION

Figure 1:
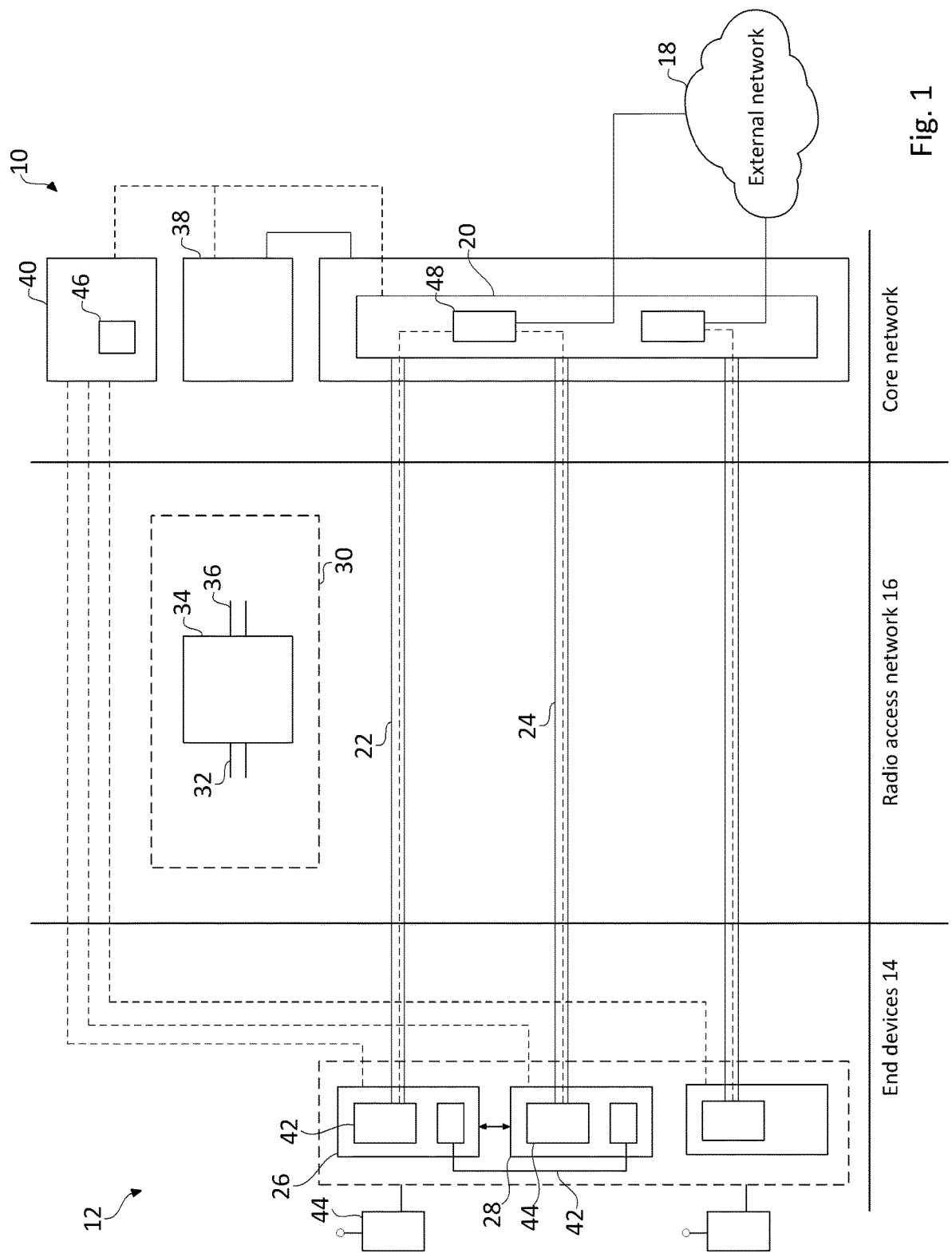
FIG. 1 shows a general outline for set up of virtual data session functionality according to the present invention.

In the following, the present invention will be explained with reference to the drawing. Here, it should be understood that such explanation is related to examples of the present invention only and not binding to the scope of the present invention as defined by the claims. As far as reference is made to specific concepts and functionalities this is to be considered as example and therefore the concepts and functionalities may be flexibly realized in hardware and/or software.

FIG. 1 shows a general outline for set up of virtual data session functionality according to the present invention.

Generally, the present invention overcomes the problem that there is no solution to bundle several radio links from fixed wireless access devices, e.g., customer premises edge CPE devices, into a single virtual link through a radio access network RAN to a core network maintaining existing service properties like charging, QoS, service differentiation etc.

As shown in FIG. 1, according to the present invention there is considered a communication infrastructure 10 comprising a cellular infrastructure 12, set up, e.g., from end devices 14, a radio access network 16, and an external network 18. Interoperability between the mobile infrastructure 12, 14, 30 and the external network is achieved by a data plane device, e.g., an UPF user plane function in 5G.

As shown in FIG. 1, according to the present invention there is introduced the concept of a virtual data session as an aggregation of at least two data sessions 22, 24 set up between at least two fixed wireless access devices 26, 28 of the cellular infra-structure 12 and the data plane device 20 providing interconnection functionality between the cellular infrastructure 12 and the external data network 18.

Heretofore, at power-on of a fixed wireless access device 26, 28 it attaches to the cellular infrastructure. The basic idea is that several fixed wireless access devices 26, 28 serving different end users can form a meshed virtual data session cloud. Each individual fixed wireless access device 26, 28 can use its services as before but in addition can provide support for a virtual data session, e.g. a virtual PDU session, between the cloud of fixed wireless access devices 26, 28 the core network 18 via the cellular infrastructure 12, being, e.g., a 3GPP RAN.

According to the present invention the bearer used in the virtual data session may provide the same properties as an individual standardized bearer service. These properties include charging, service differentiation, throughput control, guaranteed bit rate, QoS, policy control etc.

Further, the fixed wireless access device 26, 28 may be a customer premises router for fixed wireless access, a group of UE user equipment, a group of vehicles, e.g., for platooning, a group of Unmanned Aerial Vehicles UAV, etc.

As shown in FIG. 1, the virtual data session may be a PDU session 30 which consists of a radio bearer 32 between the fixed wireless access device 26 and a packet processing function 34 and a core network tunnel part 36 between packet processing function 34 and the data plane function 20, e.g., a user plane function, e.g., providing connectivity to the internet.

As is shown in FIG. 1, the access and mobility of each fixed wireless access device 26, 28 is managed by an access and mobility management device 38, e.g., an Access and Mobility Management Function AMF and a session management function SMF in 5G. Here, the access and mobility management device 38 provides session management which is responsible to manage a single data session 22, 24, e.g., a PDU session. A further device, not shown in FIG. 1, may provide a policy control function PCF establishing different policies rules for the session. Further, the access and mobility management device 38 provides user data management for handling of subscription info of the clients. It should be noted that although the access and mobility management device 38 is shown as a single device in FIG. 1 the present invention also covers the splitting of related functionality into an access and mobility device and a separate session management device.

As shown in FIG. 1, according to the present invention there is provided a virtual data session control device 40 that controls a virtual data Session between a mesh fixed wireless access devices 26, 28 and the data plane device 20. The control interface of the virtual data session control device 40 can be implemented using the access and mobility management device 38 or by directly interfacing the fixed wireless access devices 26, 28 and the virtual data session control device 40.

According to the present invention, fixed wireless access devices 26, 28 may detect automatically neighboring fixed wireless access devices 26, 28 capable of virtual data session support to build a meshed network of fixed wireless access devices 26, 28. This may be done receiving information from the virtual data session control device 40 or via direct communication between fixed wireless access devices 26, 28.

As shown in FIG. 1, the virtual data session has termination points 42, 44, 46, 48 respectively implemented in the fixed wireless access devices 26, 28, the virtual data session control device 40, and the user data plane 20. Between these termination points 42, 44, 46, 48 the virtual data session aggregates multiple data sessions of different fixed wireless access devices 26, 28 into a single flow.

Further, based on fixed wireless access device proximity information, capability, load and other parameters, the virtual data session control device 40 instructs selected fixed wireless access devices 26, 28 to create a fixed wireless access domain between identified fixed wireless access devices 26, 28 for a specific virtual data session, e.g. via WiFi or other transport 42.

Further, the virtual data session control device 40 builds a data base for the mesh of fixed wireless access devices 26, 28 and receives characteristics of individual meshed fixed wireless access devices 26, 28 forming network hops.

According to the present invention a client 44 can request a virtual data session to achieve higher aggregated throughput or better redundancy. This can be based on subscription information for example. It can be network or client initiated.

At request for a virtual data session from the client 44 the virtual data session has termination points 42, 44, 46, 48 are created the virtual data session control device 40 and new associated data sessions 22, 24 are established for each fixed wireless access device 26, 28. The virtual data session control device 40 adds to the data base all established data sessions 22, 24 that serve the virtual data session and maintains their characteristics.

In conclusion according to the present invention a new approach to establish a virtual data session has characteristics as follows:

it supports creation, modification and release of a virtual data session;
it measures characteristics of the transport between meshed fixed wireless access devices 26, 28 and considers measured characteristics in its flow distribution logic;
it measures characteristics of the aggregated data sessions per fixed wireless access device 26, 28 and considers it in its flow distribution logic; and
it load shares the traffic of a virtual data session over the individual data sessions 22, 24 and meshed fixed wireless access devices 26, 28 based on characteristics, service, load, functionality, radio conditions and information stored in the data base.

Further, according to the present invention the virtual data session:

aggregates multiple data sessions 22, 24 of different individual fixed wireless access devices 26, 28, wherein multiple virtual data sessions may be multiplexed into a single data session per fixed wireless access device 26, 28 or may be implemented on dedicated data sessions;
supports the same functions as a standard data session like charging, policy control, QoS etc. and may be tied to a subscription;
can be initiated by the network side or by the client to enhance end-to-end throughput or resilience;
can provide additional capacity or redundancy via the mesh of fixed wireless access devices 26, 28; and
can be created/added/removed/modified.

In the following further details of the present invention will be explained with reference to the drawing.

Figure 2:
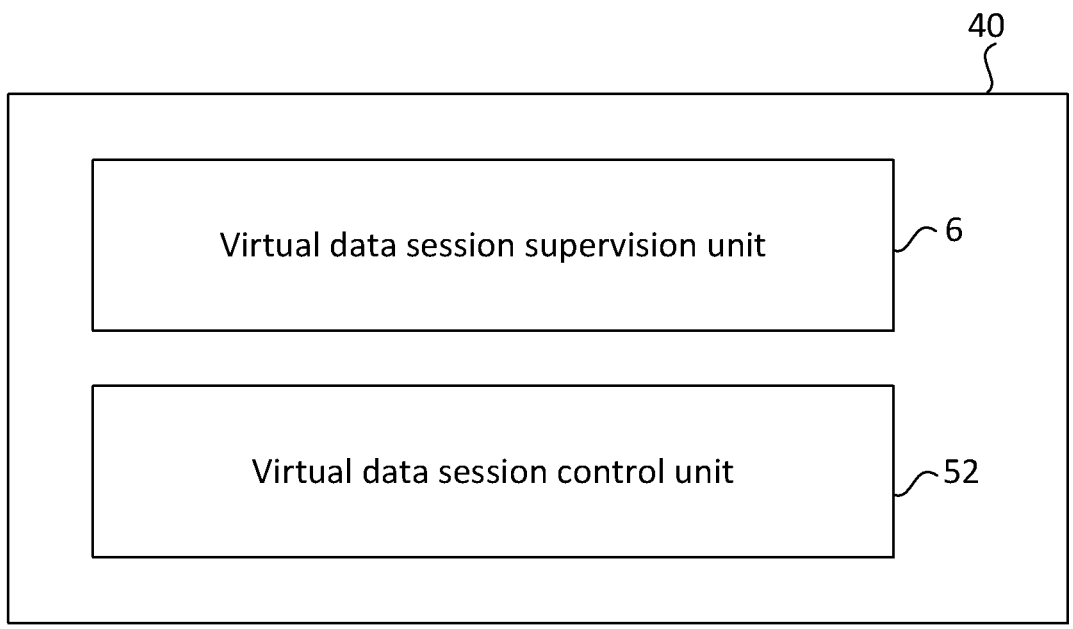
FIG. 2 shows a schematic diagram of a virtual data session control device according to the present invention.

FIG. 2 shows a schematic diagram of a virtual data session control device according to the present invention.

As shown in FIG. 2, the virtual data session control device comprises a virtual data session supervision unit 50 adapted to supervise virtual data session characteristics.

As shown in FIG. 2, the virtual data session control device further comprises a virtual data session control unit 52 adapted to adjust the setup of the virtual data session based on the supervised virtual data session characteristics.

Figure 3:
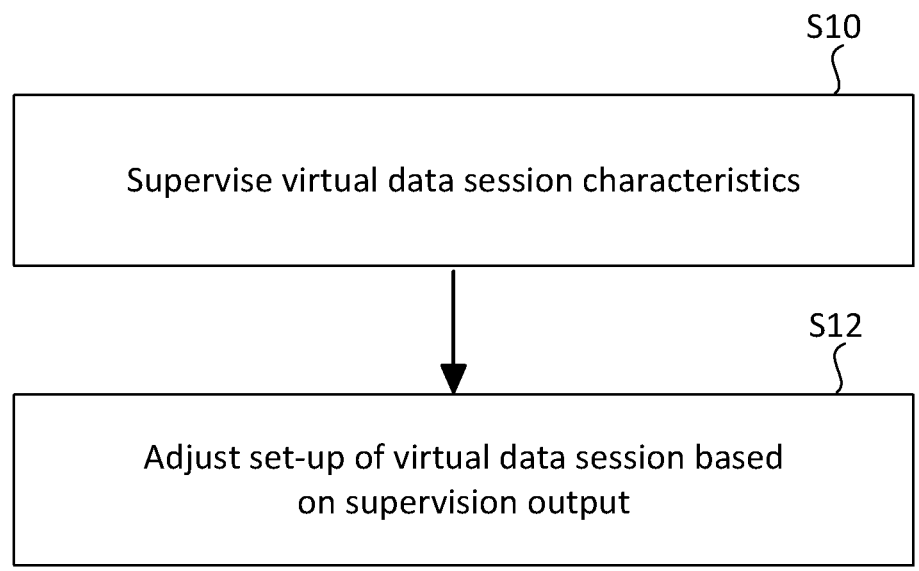
FIG. 3 shows a flowchart of operation for the virtual data session control device shown in FIG. 2.

FIG. 3 shows a flowchart of operation for the virtual data session control device shown in FIG. 2.

As shown in FIG. 3, in a step S10, operatively being executed by the virtual data session supervision unit 50, there are supervised virtual data session characteristics through measurement of at least one operative characteristic of at least one data session, at least one fixed wireless access device 26, 28, at least one link between at the least two fixed wireless access devices, and/or at least one data plane device 20 being involved in the virtual data session.

As shown in FIG. 3, in a step S12, operatively being executed by the virtual data session control unit 52, there is adjusted the setup of the virtual data session based on the result of measurement for the at least one operative characteristic.

Figure 4:
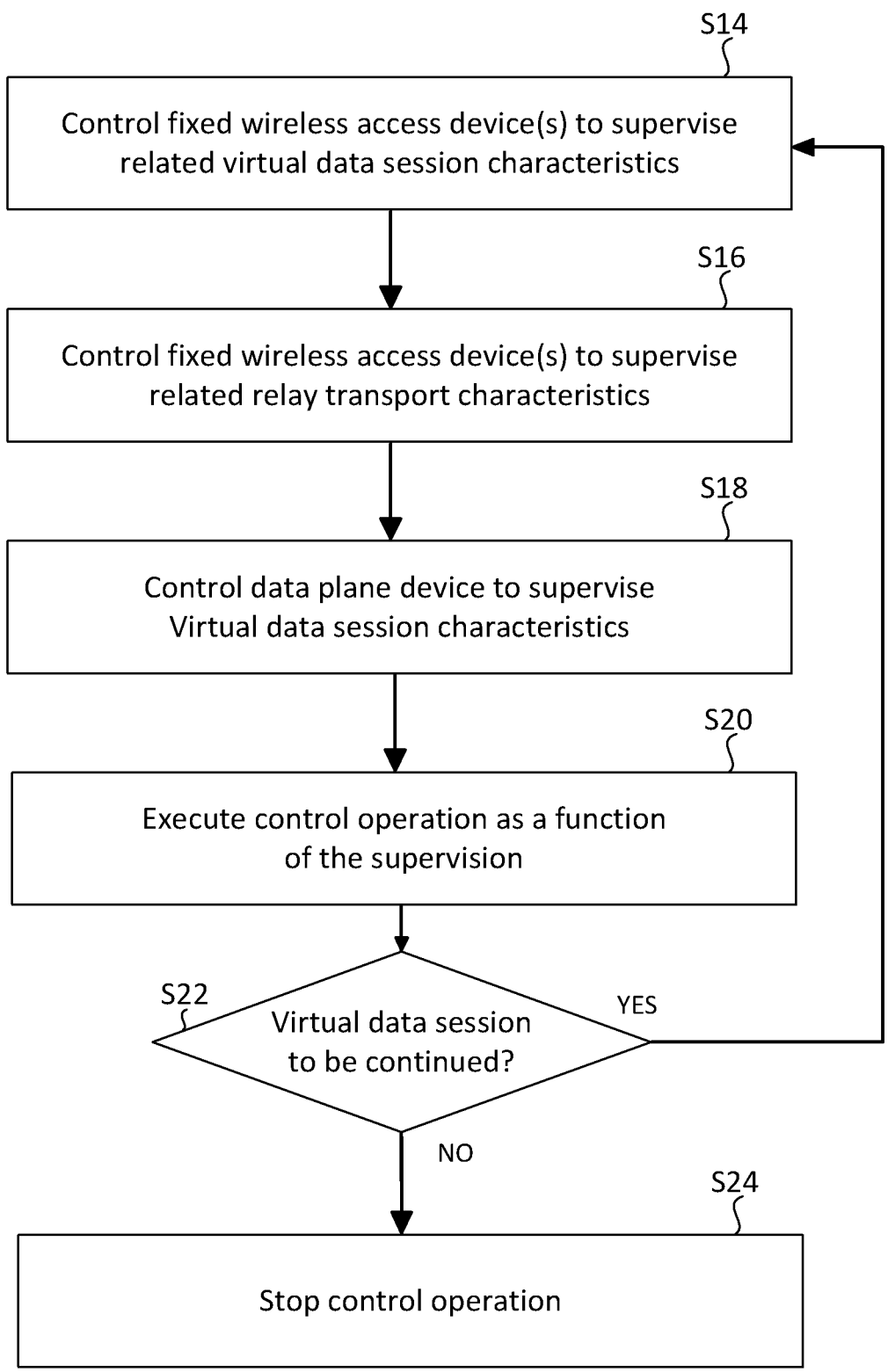
FIG. 4 shows a further flowchart of operation for the virtual data session control device shown in FIG. 2.

FIG. 4 shows a further flowchart of operation for the virtual data session control device shown in FIG. 2.

As shown in FIG. 4, in a step S14, operatively being executed by the virtual data session control unit 52, at least one fixed wireless access device 26, 28 is controlled to supervise virtual data session characteristics.

As shown in FIG. 4, in a step S16, operatively being executed by the virtual data session control unit 52, at least one fixed wireless access device 26, 28 is controlled to obtain related relay transport characteristics.

As shown in FIG. 4, in a step S18, operatively being executed by the virtual data session control unit 52, at least one data plane device 20 is controlled for supervision virtual data session characteristics.

As shown in FIG. 4, in a step S20, operatively being executed by the virtual data session control unit 52, there executed—as a function of supervision result—at least one control operation selected from a group comprising:

- adjustment of a data flow distribution between fixed wireless access devices 26, 28 based on changed radio conditions;
- adjustment of a data flow distribution between individual data session tunnels based on changed radio conditions;
- adjustment of a data flow distribution between fixed wireless access devices 26, 28 and data sessions based on end user service needs;
- removal or addition of a fixed wireless access device 26, 28 to a virtual data session;
- removal or addition of a data plane device 20 to a virtual data session; and
- removal or addition of a data session to a virtual data session.

As shown in FIG. 4, in a step S22, operatively being executed by the virtual data session control unit 52, it is interrogated whether the virtual data session is to be continued. If so, the process branches back to step S14. Otherwise there follows a step S24, operatively being executed by the virtual data session control unit 52, to stop the control operation and to terminate the virtual data session process.

Figure 5:
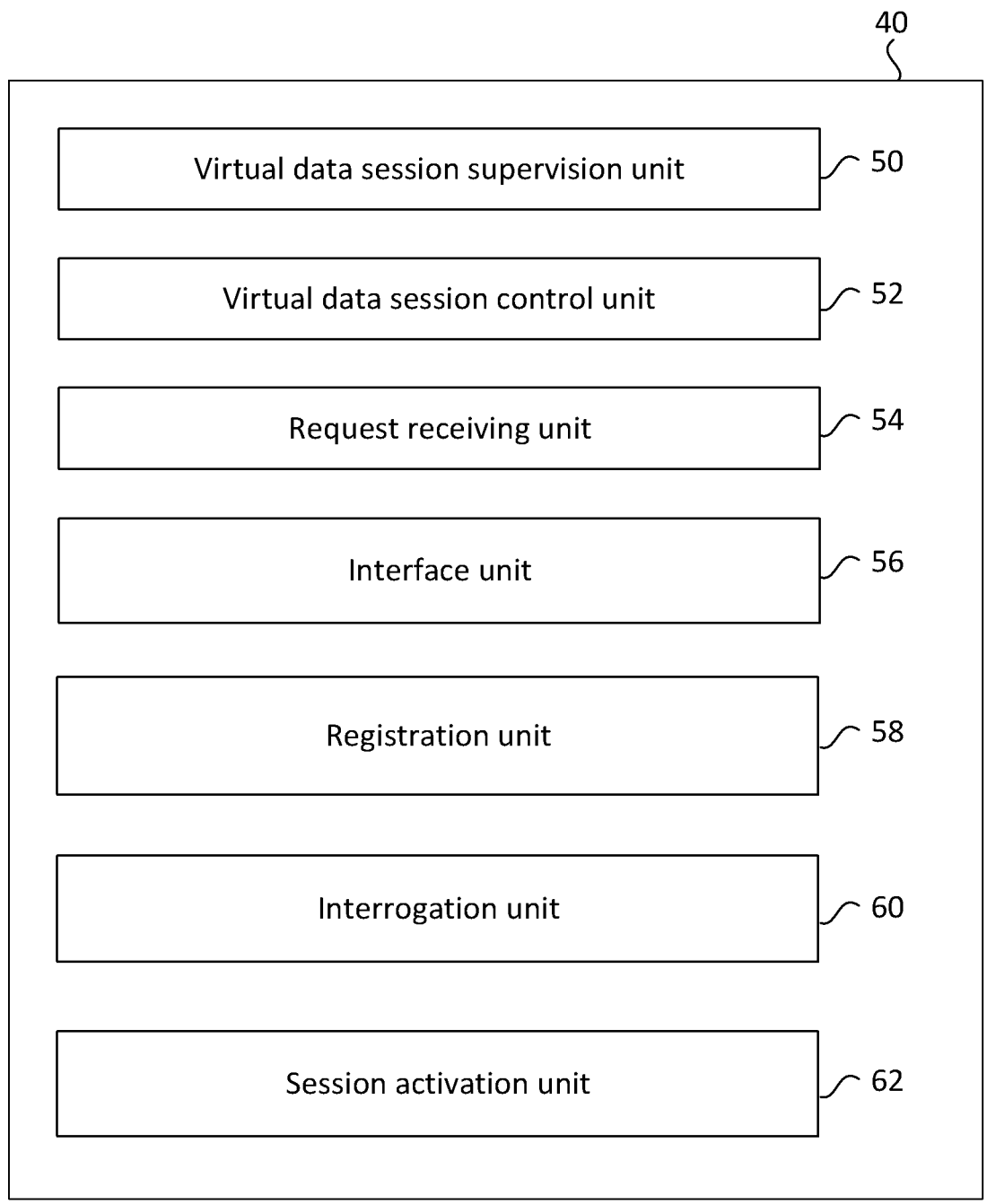
FIG. 5 shows a further detailed schematic diagram of a virtual data session control device according to the present invention.

FIG. 5 shows a further detailed schematic diagram of the virtual data session control device 40 according to the present invention.

As shown in FIG. 5, the virtual data session control device 40 comprises the virtual data session supervision unit 50 and the virtual data session control unit 52 as already explained above with respect to FIG. 2 and FIG. 3. Therefore, redundant explanations thereof will not be repeated here.

As shown in FIG. 5, the virtual data session control device 40 further comprises a request receiving unit 54 adapted to receive a request for a virtual data session from a fixed wireless access device 26, 28 and/or the external data network 18 and an interface unit 56 adapted to establish a communication channel between the virtual data session control device and the at least two fixed wireless access devices 26, 28 and the at least one data plane device 20 being involved in the virtual data session.

As shown in FIG. 5, the virtual data session control device further comprises a registration unit 58 adapted to register the virtual data session control device at an access and mobility management device which relays virtual data session related control information between the virtual data session control device 40, the fixed wireless access devices 26, 28, and the data plane device 20. The registration unit 58 may also be adapted to register the at least two fixed wireless access devices 26, 28 and the at least one data plane device 20 being involved in the virtual data session at the virtual data session control device 40.

As shown in FIG. 5, the virtual data session control device 40 further comprises an interrogation unit 60 adapted to contact the at least two fixed wireless access devices 26, 28 and the at least one data plane device 20 being involved in the virtual data session for interrogation of related operative capabilities.

As shown in FIG. 5, the virtual data session control device 40 further comprises a session activation unit 62 adapted to select at least two fixed wireless access devices 26, 28 to form a fixed wireless access domain for the virtual data session.

Figure 6:
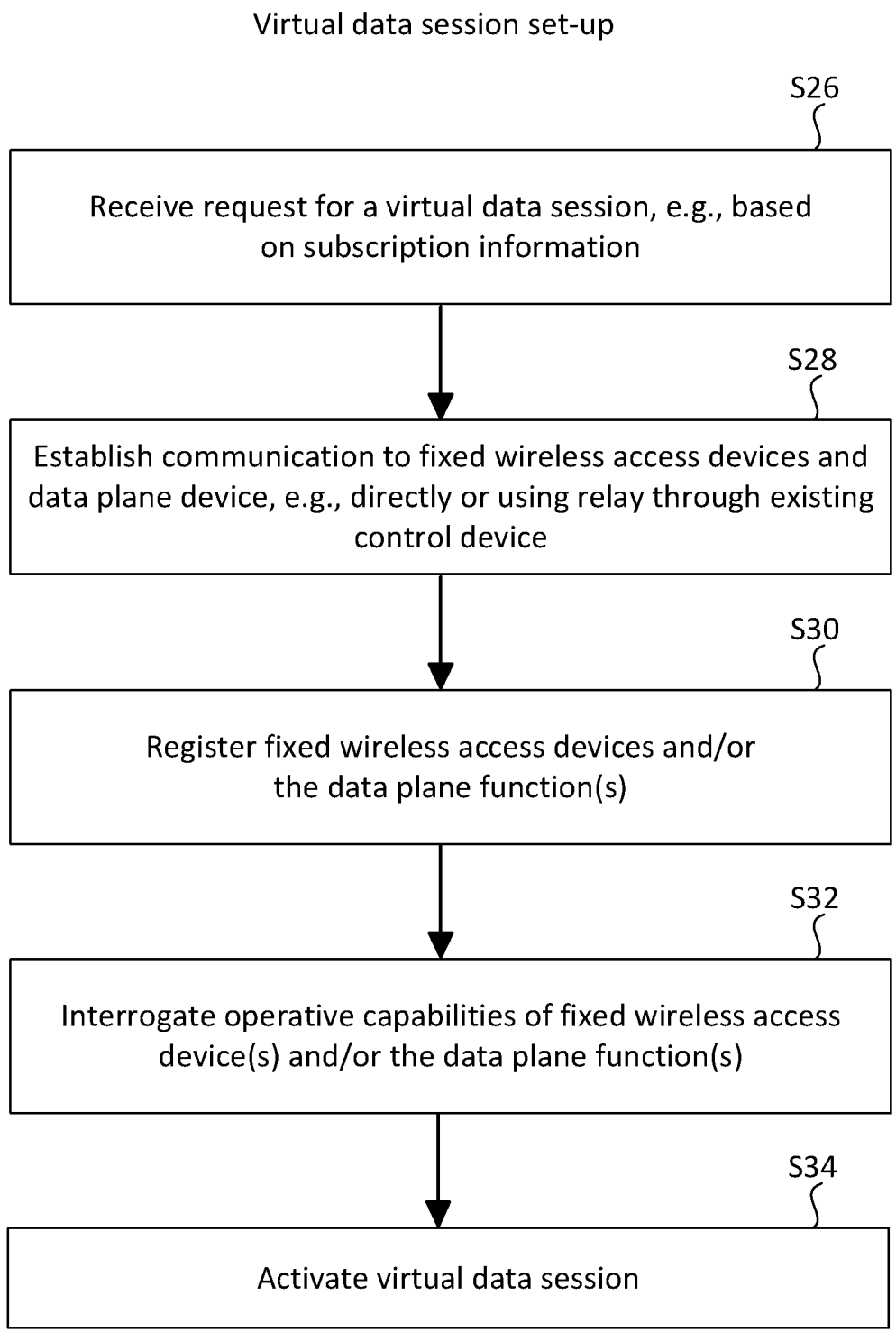
FIG. 6 shows a flowchart of operation for the virtual data session control device shown in FIG. 5.

FIG. 6 shows a flowchart of operation for the virtual data session control device 40 shown in FIG. 5.

As shown in FIG. 6, in a step S26, operatively being executed by the request receiving unit 54, a request for a virtual data session is received from a fixed wireless access device 26, 28 and/or the external data network 18. Here, the request may be received based on subscription information.

As shown in FIG. 6, in a step S28, operatively being executed by the interface unit 56, there is established a communication channel between the virtual data session control device 40 and the at least two fixed wireless access devices 26, 28 and the at least one data plane device 20 being involved in the virtual data session.

As shown in FIG. 6, in a step S30, operatively being executed by the registration unit 58, the virtual data session control device 40 is registered at an access and mobility management device 38 which relays virtual data session related control information between the virtual data session control device 40, the fixed wireless access devices 26, 28, and the data plane device 20. Further, in step S30 the at least two fixed wireless access devices 26, 28 and the at least one data plane device 20 being involved in the virtual data session are registered at the virtual data session control device 40.

As shown in FIG. 6, in a step S32, operatively being executed by the interrogation unit 60, the at least two fixed wireless access devices 26, 28 and the at least one data plane device 20 being involved in the virtual data session are contacted for interrogation of related operative capabilities.

As shown in FIG. 6, in a step S32, operatively being executed by the session activation unit 62, a virtual data session is activated.

Figure 7:
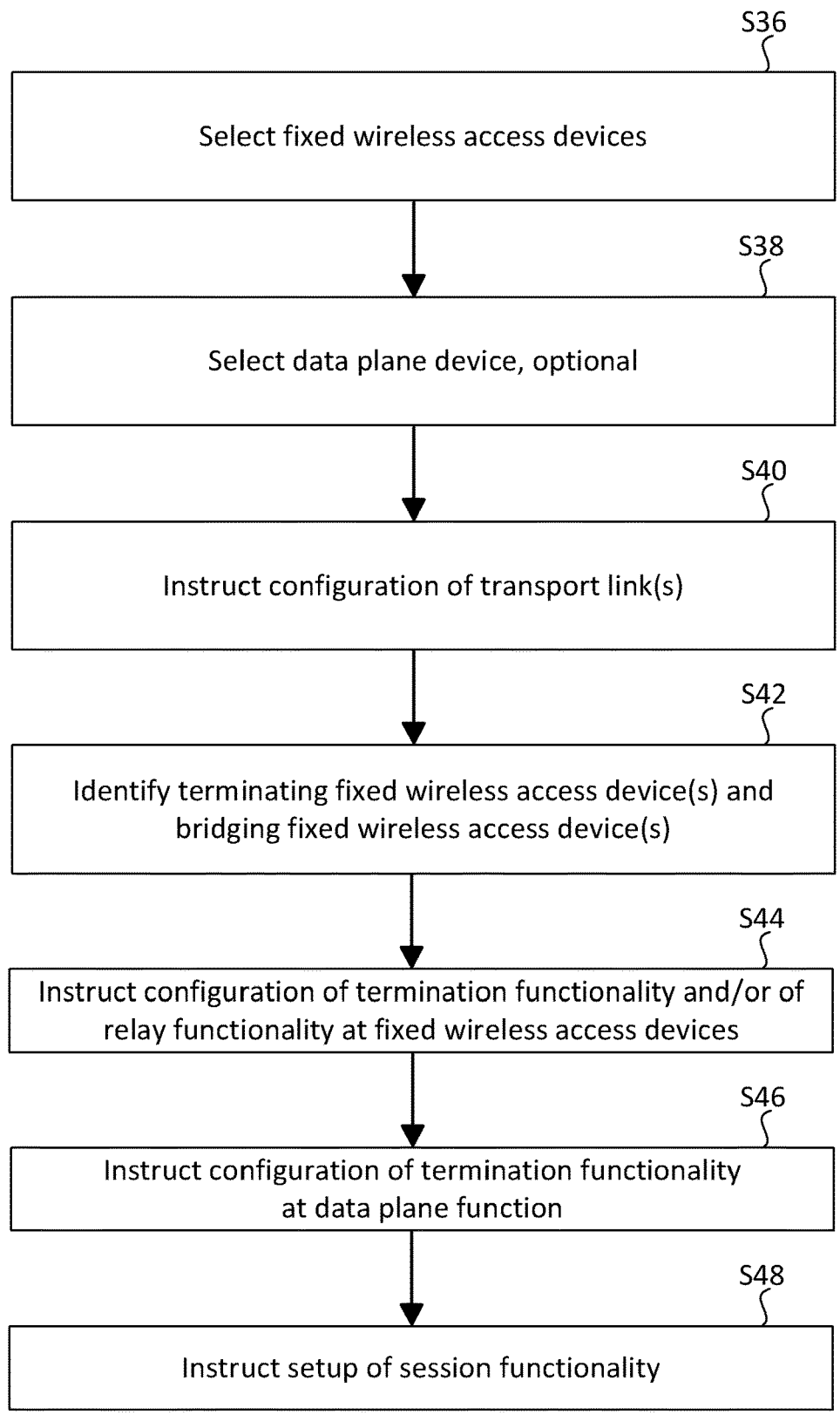
FIG. 7 shows a further flowchart of operation for the virtual data session control device shown in FIG. 5.

FIG. 7 shows a further flowchart of operation for the virtual data session control device 40 shown in FIG. 5 in particular with respect to the set-up of a virtual data session.

As shown in FIG. 7, in a step S36, operatively being executed by the session activation unit 62, at least two fixed wireless access devices 26, 28 are selected to form a fixed wireless access domain for the virtual data session. If more than two user data planes are involved also these will be identified in an optional step S38.

As shown in FIG. 7, in a step S40, operatively being executed by the session activation unit 62, there is instructed a configuration of at least one transport link between the at least two fixed wireless access devices 26, 28 in the fixed wireless access domain. Further, in a step S42, operatively being executed by the session activation unit 62, there is executed a grouping of the at least two fixed wireless access devices 26, 28 in the fixed wireless access domain into at least one terminating fixed wireless access device 26 for terminating the virtual data session and at least one bridging fixed wireless access device 38 for relaying data between the at least two fixed wireless access devices 26, 28.

As shown in FIG. 7, in a step S44, operatively being executed by the session activation unit 62, there is instructed a configuration of termination functionality in the at least one terminating fixed wireless access device 26, 28. Further, in step S44 there is instructed configuration of relaying transport functionality in the at least one bridging fixed wireless access device 28.

As shown in FIG. 7, in a step S46, operatively being executed by the session activation unit 62, there is selected the at least one data plane device 20 there is instructed configuration of termination functionality in the at least one data plane device 20.

As shown in FIG. 7, in a step S48, operatively being executed by the session activation unit 62, there is instructed a setup of virtual session functionality with respect to the at least two data sessions at the least two fixed wireless access devices 26, 28 and the at least one data plane function device 20 being involved in the virtual data session.

Finally, after virtual data session activation the virtual data session control unit 40 may the forwarding rules in the at least two fixed wireless access devices 26, 28 and the at least one data plane function device 20 being involved in the virtual data session.

Figure 8:
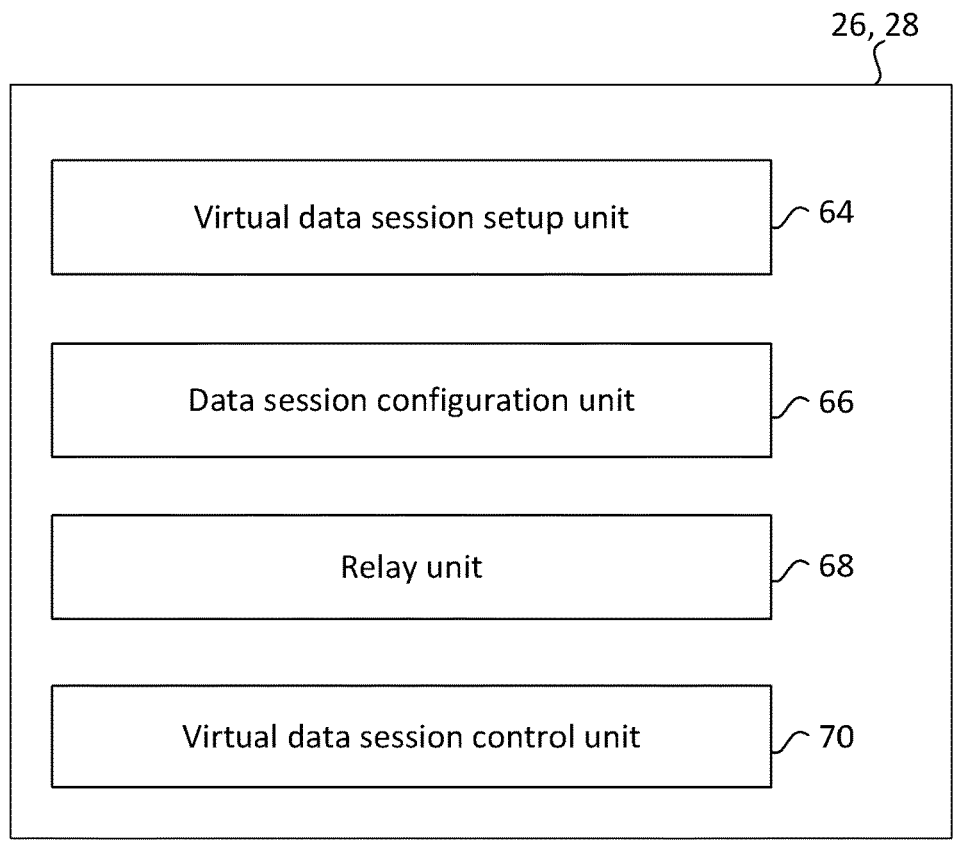
FIG. 8 shows a schematic diagram of a fixed wireless access device according to the present invention.

FIG. 8 shows a schematic diagram of a fixed wireless access device 26, 28 according to the present invention.

As shown in FIG. 8, the fixed wireless access device 26, 28 comprises a virtual data session setup unit 64 adapted to receive a virtual session command to join a virtual data session and a data session initiation unit 66 adapted to initiate at least one data session for exchange of payload data of the virtual data session to/from the fixed wireless access device.

As shown in FIG. 8, the fixed wireless access device 26, 28 further comprises a relay unit 68 adapted to relay payload data of the virtual data session to/from at least one neighbouring fixed wireless access device in the fixed wireless access domain for load sharing within the fixed wireless access domain.

As shown in FIG. 8, the fixed wireless access device 26, 28 further comprises a virtual data session control unit 70 adapted to control the load sharing between at least one data session of the virtual data session and the relay unit 68 according to predetermined criteria.

Figure 9:
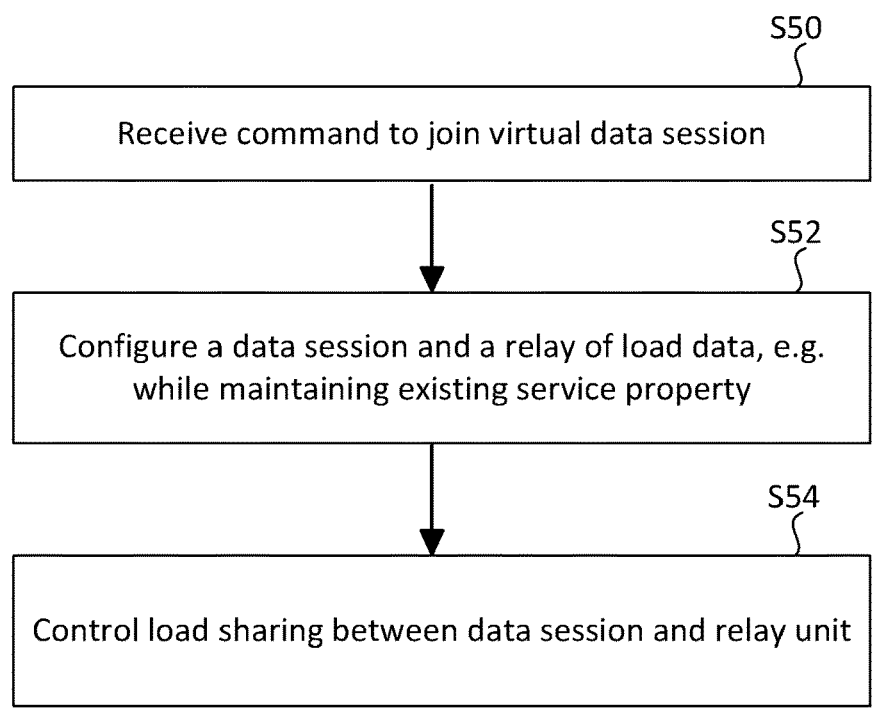
FIG. 9 shows a flowchart of operation for the fixed wireless access device shown in FIG. 9.

FIG. 9 shows a flowchart of operation for the fixed wireless access device shown in FIG. 9.

As shown in FIG. 9, in a step S50 operatively being executed by the virtual data session setup unit 64, there is received a virtual session command to join a virtual data session at the fixed wireless access device 26, 28.

As shown in FIG. 9, in a step S52 operatively being executed by the data session initiation unit 66, there is initiated at least one data session for exchange of payload data of the virtual data session to/from the fixed wireless access device. Preferably this is achieved while maintaining existing service property. Further, in the same step S52 through operation of the relay unit 68 there is executed setup and relay of payload data.

As shown in FIG. 9, in a step S54, operatively being executed by the virtual data session control unit 70, there is executed control of the load sharing between at least one data session of the virtual data session and the relay unit 68 according to predetermined criteria.

Figure 10:
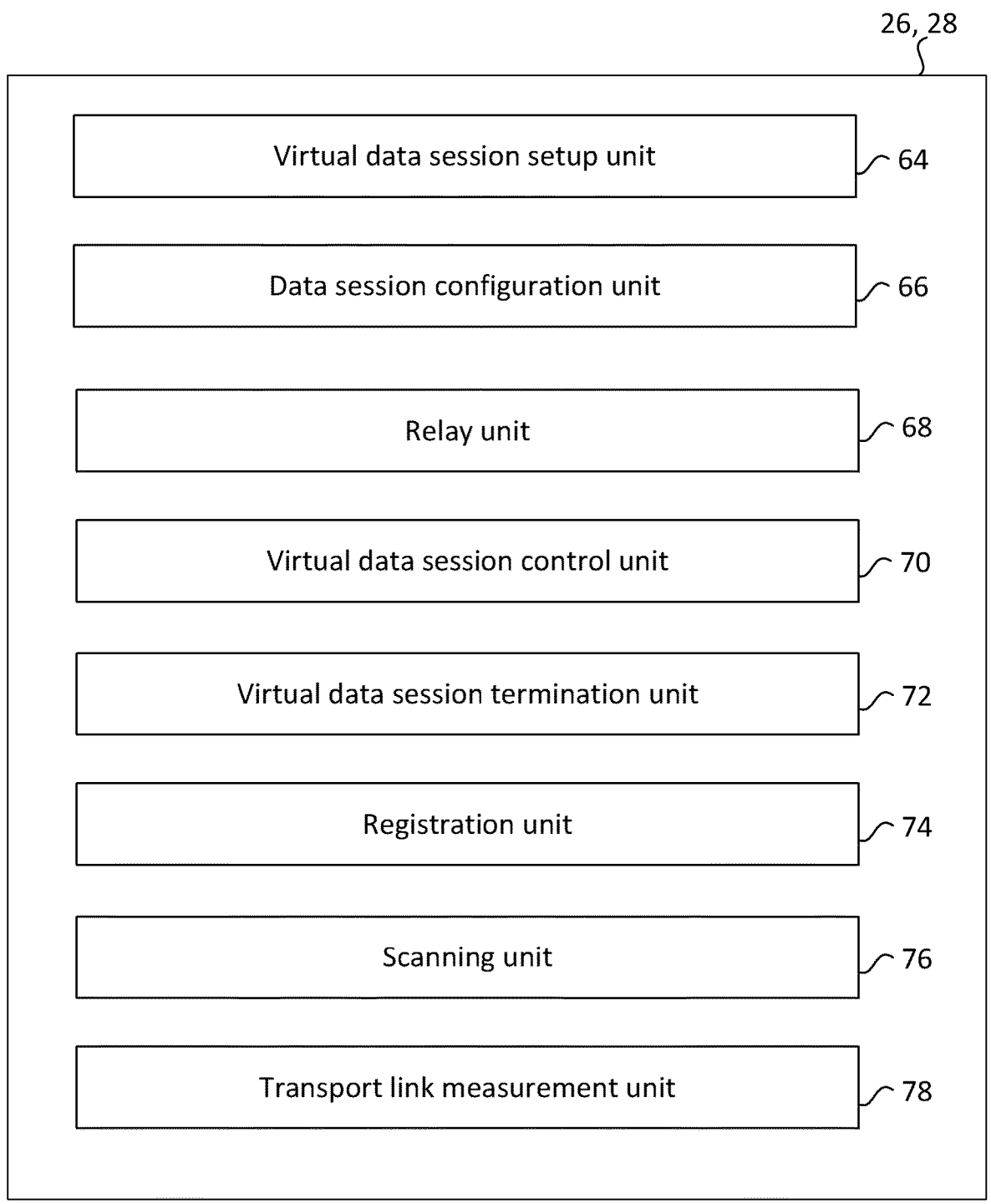
FIG. 10 shows a further schematic diagram of a fixed wireless access device according to the present invention.

FIG. 10 shows a further schematic diagram of the fixed wireless access device 26, 28 according to the present invention.

As shown in FIG. 10, the fixed wireless access device 26, 28 comprises the virtual data session setup unit 64, the data session configuration unit 66, the relay unit 68, and the virtual data session control unit 70 as already explained above with respect to FIG. 8. Therefore, redundant explanations thereof will not be repeated here.

As shown in FIG. 10, the fixed wireless access device 26, 28 further comprises a virtual data session termination unit 72 adapted to terminate the virtual data session and a registration unit 74 adapted to register the fixed wireless access device 26, 28 at a serving virtual data session control device 40 controlling the virtual data session.

As shown in FIG. 10, the fixed wireless access device 26, 28 further comprises a scanning unit 76 adapted to scan for neighbouring fixed wireless access devices supporting virtual data sessions and a transport link measurement unit 78 adapted to measure transport link characteristics of the transport link between neighbouring fixed wireless access devices and report the measured transport link characteristics to the virtual data session control device 40.

Figure 11:
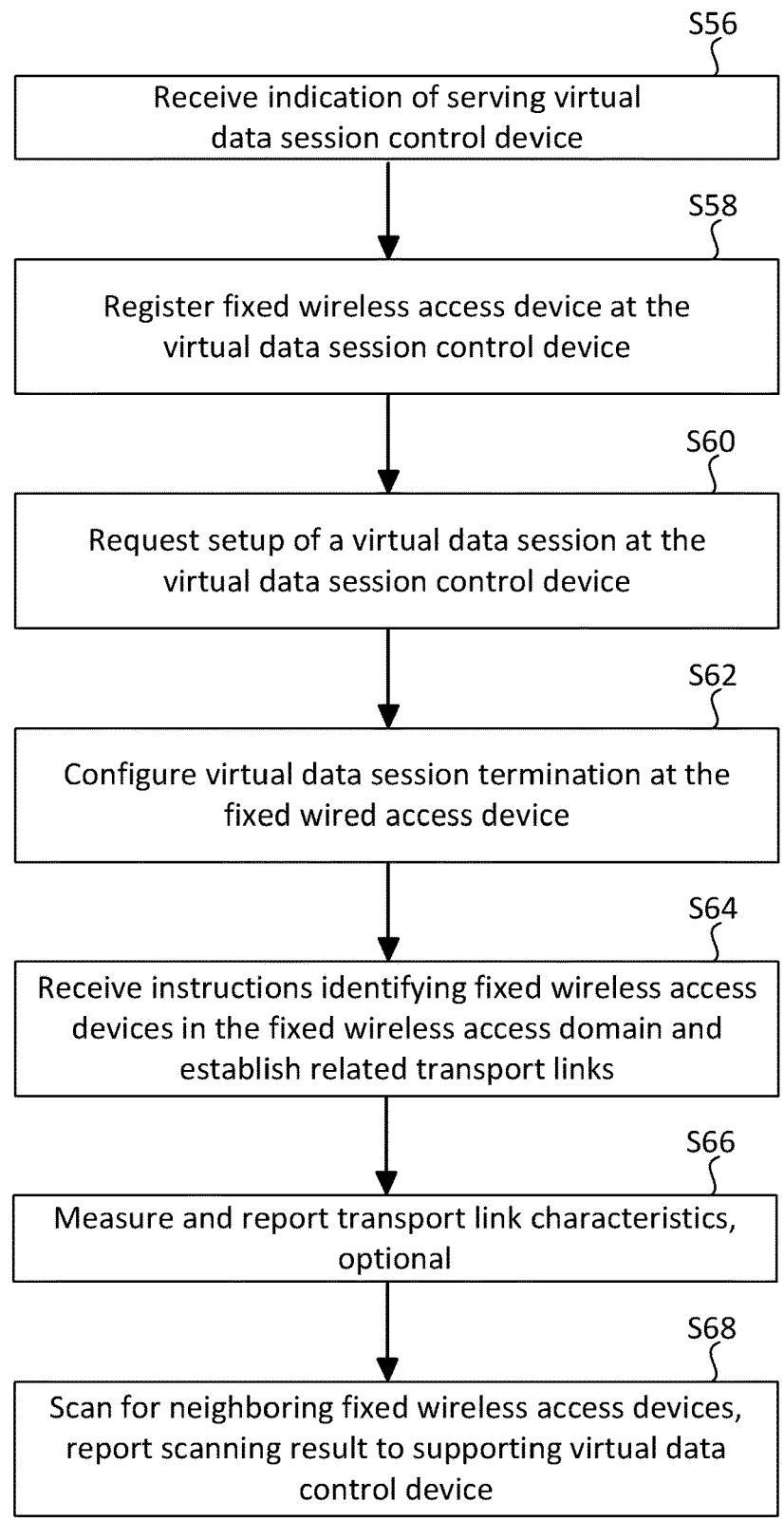
FIG. 11 shows a further flowchart of operation for the fixed wireless access device shown in FIG. 10.

FIG. 11 shows a further flowchart of operation for the fixed wireless access device 26, 28 shown in FIG. 10. The functionality explained with respect to FIG. 11 supplements the functionality explained above with respect to FIG. 9.

As shown in FIG. 11, in a step S56, operatively being executed by the virtual data setup unit 72, there is received an indication or an address of a serving virtual data session control device 40 at the fixed wireless access device 26, 28. Then, in a step S58, operatively being executed by the virtual data setup unit 72, the fixed wireless access device 26, 28 is registered at the serving virtual data session control device 40.

As shown in FIG. 11, in a step S60, operatively being executed by the virtual data setup unit 72, there is requested the setup of a virtual data session at the serving virtual data session control device 40. Then follows a step S62, operatively being executed by the virtual data session termination unit 72, to terminate the virtual data session at the fixed wireless access device 26, 28, e.g., under the condition that the virtual session command instructs the fixed wireless access device to join the virtual data session as terminating point of the virtual data session.

As shown in FIG. 11, in a step S64, operatively being executed by the virtual data session setup unit 64, there are received instructions from the serving virtual data session control device 40 which indicates at least one neighbouring fixed wireless access device in the fixed wireless access domain for load sharing. Then in step S64, partly executed by the relay unit 68, there is established at least one transport link to the at least one neighbouring fixed wireless access device in the fixed wireless access domain setup for the virtual data session.

As shown in FIG. 11, in an optional step S66, operatively being executed by the transport link measurement unit 78, there are measured transport link characteristics of the transport link(s) to the at least one neighbouring fixed wireless access device in the fixed wireless access domain. The measured transport link characteristics may be reported to the serving virtual data session control device 40.

As shown in FIG. 11, in an optional step S68, operatively being executed by the scanning unit 76, there is executed a scan to identify neighbouring fixed wireless access devices supporting virtual data sessions. These may again be reported to the serving virtual data session control device 40.

Figure 12:
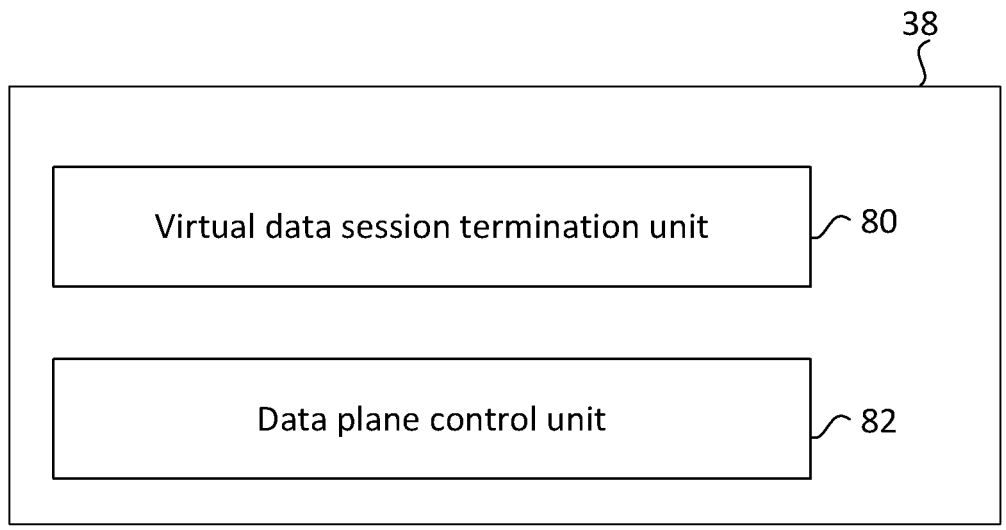
FIG. 12 shows a schematic diagram of a data plane device according to the present invention.

FIG. 12 shows a schematic diagram of a data plane device 20 according to the present invention.

As shown in FIG. 12, the data plane device comprises at least one virtual data session termination unit 80 adapted to terminate the at least two data sessions set up for exchange of payload data with the data plane device 20 and a data plane control unit 82 adapted to control a virtual data session established through aggregation of the at least two data sessions terminated by the at least one data session termination unit 80.

Figure 13:
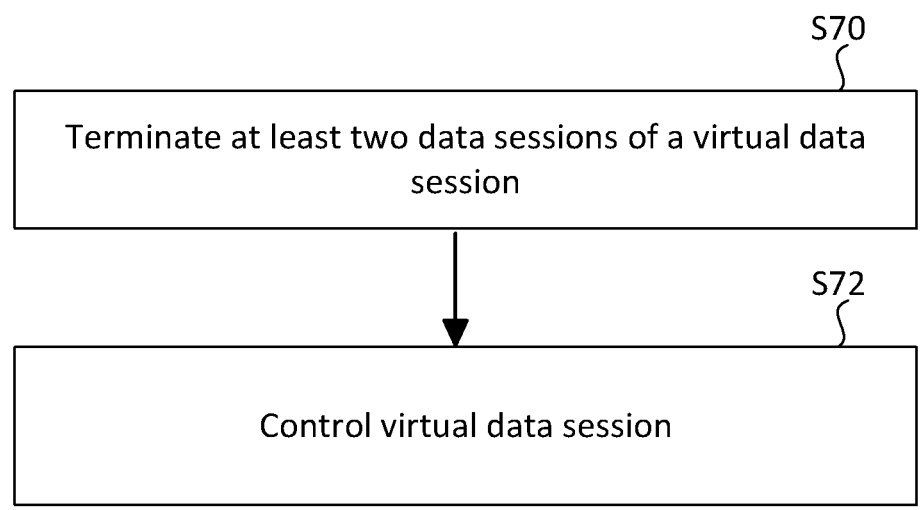
FIG. 13 shows a flowchart of operation for the data plane device shown in FIG. 12.

FIG. 13 shows a flowchart of operation for the data plane device shown in FIG. 12.

As shown in FIG. 13, in a step S70, operatively being executed by the virtual data session termination unit 80, the at least two data sessions set up for exchange of payload data with the data plane device 20 is terminated at the data plane device 20.

As shown in FIG. 13, in a step S72, operatively being executed by the data plane control unit 82, there is executed control of the virtual data session established through aggregation of the at least two data sessions terminated by the at least one data session termination unit 80.

Figure 14:
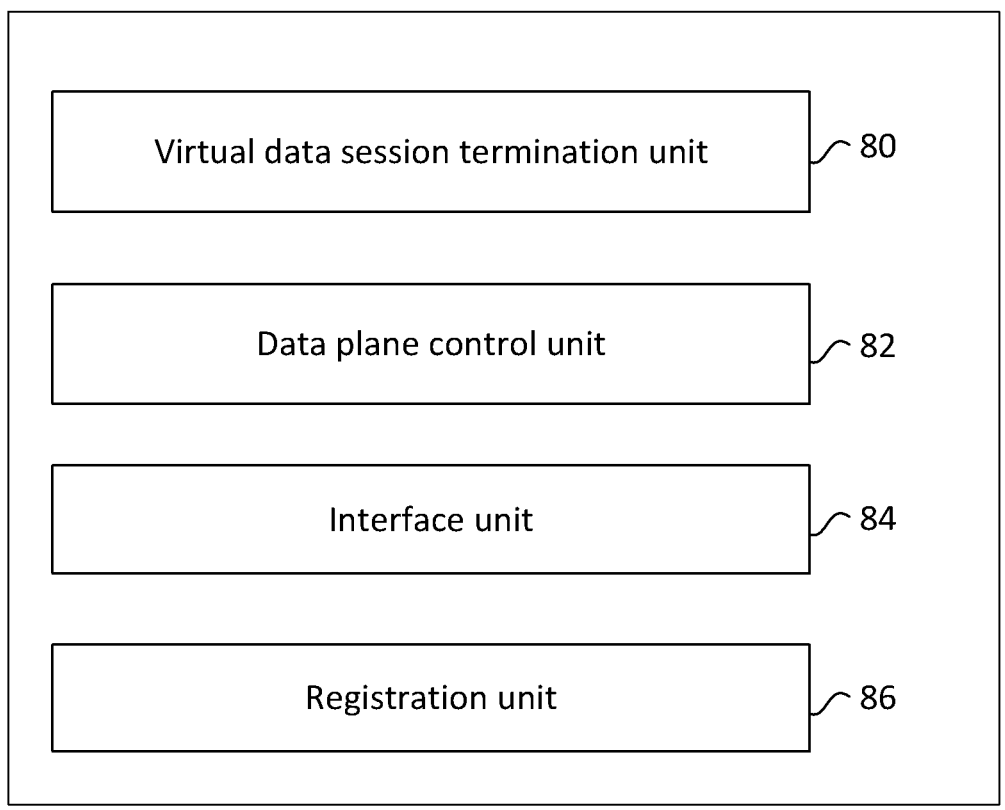
FIG. 14 shows a further schematic diagram of a data plane device according to the present invention.

FIG. 14 shows a further schematic diagram of a data plane device according to the present invention.

As shown in FIG. 14, the data plane device 20 comprises the virtual data session termination unit 80 and the data plane control unit 82 as already explained above with respect to FIG. 12. Therefore, redundant explanations thereof will not be repeated here.

As shown in FIG. 14, the data plane device 20 comprises an interface unit 84 adapted to receive indication of a serving virtual data session control device 40. The interface unit 84 is optionally adapted to indicate support for virtual data session functionality to the serving virtual data session control device 40

As shown in FIG. 14, the data plane device 20 comprises a registration unit 86 adapted register the data plane device 20 at the serving virtual data session control device 40.

Figure 15:
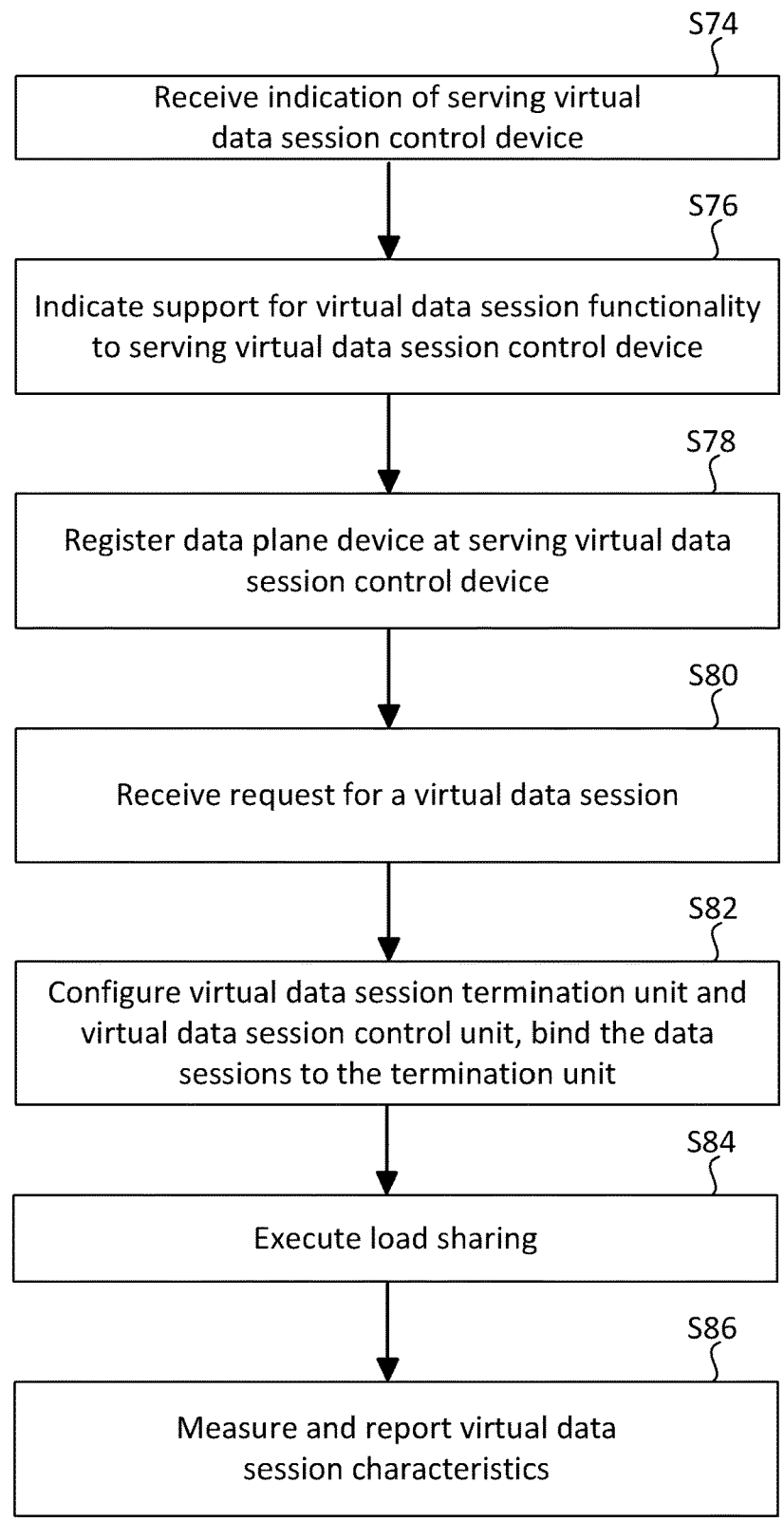
FIG. 15 shows a flowchart of operation for the data plane device shown in FIG. 14.

FIG. 15 shows a flowchart of operation for the data plane device shown in FIG. 14. The functionality explained with respect to FIG. 15 supplements the functionality explained above with respect to FIG. 13.

As shown in FIG. 15, in a step S74, operatively being executed by the interface unit 84, there is received an indication of a serving virtual data session control device 40. Then in a step S76, operatively being executed by the interface unit 84, there is indicated support for virtual data session functionality to the serving virtual data session control device 40.

As shown in FIG. 15, in a step S78, operatively being executed by the registration unit 86, the data plane device 20 is registered at the serving virtual data session control device 40.

As shown in FIG. 15, in a step S80, operatively being executed by the registration unit 86, there is received a request for a virtual data session which indicates at least two data sessions being aggregated for establishment of the virtual data session.

As shown in FIG. 15, in a step S82, operatively being executed by the data plane control unit 82, the virtual data session termination unit 80 is configured to terminate the at least two data sessions being aggregated for establishment of the virtual data session, bind the at least two data sessions being aggregated for establishment of the virtual data session to a corresponding virtual data session termination unit 80. This may be achieved in real time upon receipt of a request for a virtual data session.

As shown in FIG. 15, in a step S84, operatively being executed by the data plane control unit 82, there is executed load sharing in downlink direction to the cellular infrastructure and with respect to the at least two data sessions being aggregated for establishment of the virtual data session. Further, in the step S84 there is executed combination of data flows in uplink direction to the external data network with respect to the at least two data sessions being aggregated for establishment of the virtual data session.

As shown in FIG. 15, in a step S84, operatively being executed by the virtual data session termination unit 80, virtual data session characteristics are measure and reported to the virtual data session control device 40.

Figure 16:
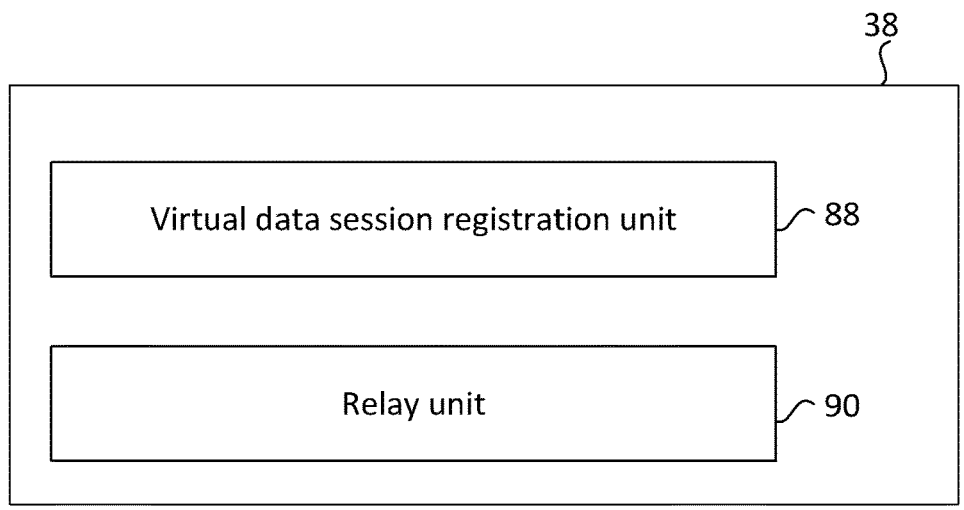
FIG. 16 shows a schematic diagram of an access and mobility management device according to the present invention.

FIG. 16 shows a schematic diagram of an access and mobility management device 38 according to the present invention.

As shown in FIG. 16, the access and mobility management device 38 comprises a virtual data session registration unit 88 adapted to receive a request for registration from a virtual data session control device (40) controlling a virtual data session. Then, virtual data session registration unit 88 adapted to receive a request for registration from fixed wireless access devices 26, 28 being involved in the virtual data session and to register the fixed wireless access devices 26, 28 at the virtual data session control device 40.

As shown in FIG. 16, the access and mobility management device 38 further comprises a relay unit 90 adapted to relay virtual data session related control information between the registered virtual data session control device controlling the virtual data session and the fixed wireless access devices 26, 28 being registered for the virtual data session.

Figure 17:
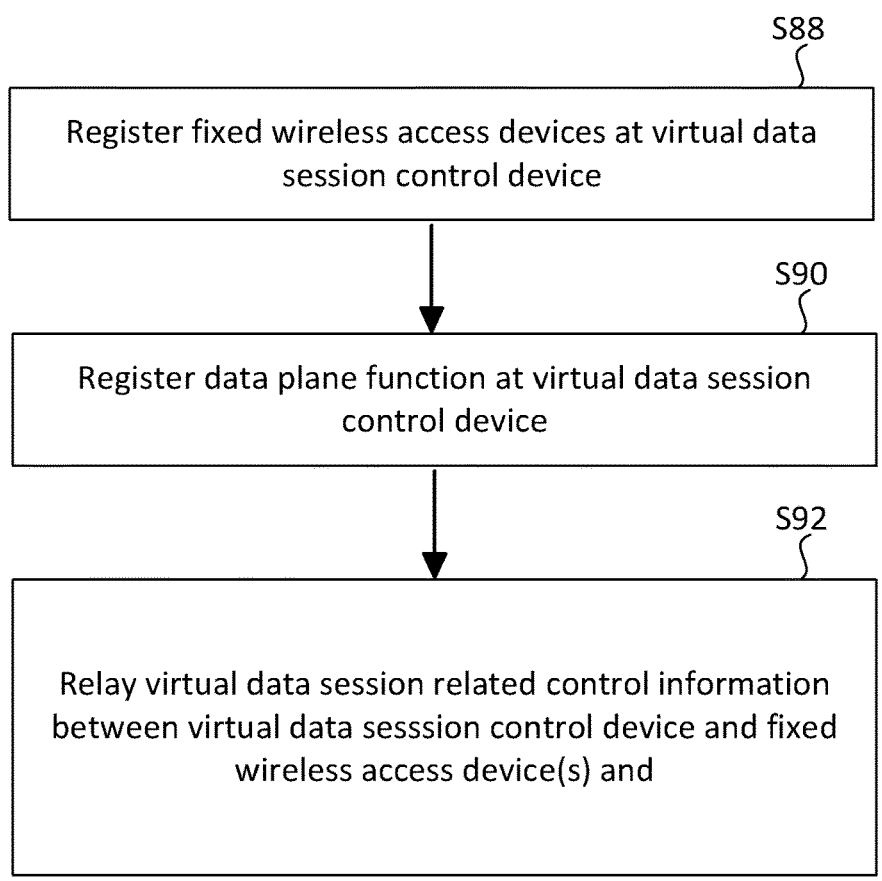
FIG. 17 shows a flowchart of operation for the access and mobility management device shown in FIG. 16.

FIG. 17 shows a flowchart of operation for the access and mobility management device shown in FIG. 16.

As shown in FIG. 17, in a step S88, operatively being executed by the virtual data session registration unit 88, the fixed wireless access devices 26, 28 of a virtual data session are virtual data session control device 40.

As shown in FIG. 17, in a step S90, operatively being executed by the virtual data session registration unit 88, the data plane function 20 of the virtual data session is registered at the virtual data session control device 40. This may be done upon receipt of receive a request for registration from the data plane device 20.

As shown in FIG. 17, in a step S92, operatively being executed by the relay unit 90, virtual data session related control information is relayed between a virtual data session control device 40 controlling the virtual data session and the registered fixed wireless access devices 26, 28.

The invention claimed is:

1. A method of fixed wireless access to a cellular infrastructure supporting virtual data session functionality, a virtual data session is an aggregation of at least two data sessions set up between at least two fixed wireless access devices forming a fixed wireless access domain in the cellular infrastructure and at least one data plane device providing interconnection functionality between the cellular infrastructure and an external data network, the method for fixed wireless access comprising:

a command receiving operation for receiving a virtual session command to join a virtual data session;

a data session initiation operation for initiating at least one data session for exchange of payload data of the virtual data session to/from the fixed wireless access device;

a relay operation for relaying payload data of the virtual data session to/from at least one neighbouring fixed wireless access device in the fixed wireless access domain and for load sharing within the fixed wireless access domain; and a virtual data session control operation for controlling the load sharing between at least one data session of the virtual data session and the relay unit according to predetermined criteria, wherein the virtual data session is set up while maintaining at least one existing service property of at least one data session terminated by the fixed wireless access device, and wherein the at least one existing service property is selected from a group comprising charging, service differentiation, throughput control, guaranteed bit rate, quality of service, and policy control.

2. The method of fixed wireless access to a cellular infrastructure according to claim 1, comprising a registration operation for registering the fixed wireless access device at a serving virtual data session control device controlling the virtual data session.

3. The method of fixed wireless access to a cellular infrastructure according to claim 1, comprising a scanning operation for scanning neighbouring fixed wireless access devices supporting virtual data sessions, particularly comprising a reporting operation for reporting neighbouring fixed wireless access devices supporting virtual data sessions and network characteristics between neighbouring fixed wireless access devices supporting virtual data sessions to the serving virtual data session control device.

4. The method of fixed wireless access to a cellular infrastructure according to claim 1, comprising a request operation for requesting setup of a virtual data session at the serving virtual data session control device.

5. The method of fixed wireless access to a cellular infrastructure according to claim 1, comprising a receiving operation for receiving an instruction from the serving virtual data session control device which indicates at least one neighbouring fixed wireless access device in the fixed wireless access domain for load sharing and an establishment operation for establishing a transport link to the at least one neighbouring fixed wireless access device in the fixed wireless access domain.

6. The method of fixed wireless access to a cellular infrastructure according to claim 5, comprising a transport link measurement operation for measuring transport link characteristics of the transport link to the at least one neighbouring fixed wireless access device in the fixed wireless access domain, particularly comprising a reporting operation for reporting the measured transport link characteristics to the serving virtual data session control device.

7. A fixed wireless access device operated in a cellular infrastructure and supporting virtual data session functionality, a virtual data session is an aggregation of at least two data sessions set up between at least two fixed wireless access devices forming a fixed wireless access domain in the cellular infrastructure and at least one data plane device providing interconnection functionality between the cellular infrastructure and an external data network, the fixed wireless access device comprising:

processing circuitry and a non-transitory computer readable storage medium storing an executable computer program, comprising instructions which, when executed on the processing circuitry, cause the processing circuitry to:

receive a virtual session command to join a virtual data session;

initiate at least one data session for exchange of payload data of the virtual data session to/from the fixed wireless access device;

relay payload data of the virtual data session to/from at least one neighbouring fixed wireless access device in the fixed wireless access domain for load sharing within the fixed wireless access domain; and control the load sharing between at least one data session of the virtual data session and the relay unit according to predetermined criteria, wherein the virtual data session is set up while maintaining at least one existing service property of at least one data session terminated by the fixed wireless access device, and wherein the at least one existing service property is selected from a group comprising charging, service differentiation, throughput control, guaranteed bit rate, quality of service, and policy control.

8. The fixed wireless access device according to claim 7, which is configured as a customer premises router for fixed wireless access, a group of user terminals, a group of vehicles, and/or a group of unmanned aerial vehicles.

* * * * *